(12) United States Patent
Hebbale et al.

(10) Patent No.: US 6,174,256 B1
(45) Date of Patent: Jan. 16, 2001

(54) POWERTRAIN WITH A SIX SPEED TRANSMISSION

(75) Inventors: Kumaraswamy V. Hebbale; Sekhar Raghavan; Patrick Benedict Usoro, all of Troy, MI (US)

(73) Assignee: General Motors Corporation, Detroit, MI (US)

(*) Notice: Under 35 U.S.C. 154(b), the term of this patent shall be extended for 0 days.

(21) Appl. No.: 09/442,307

(22) Filed: Nov. 22, 1999

(51) Int. Cl.$^7$ .................................................... F16H 57/10
(52) U.S. Cl. ................................................................. 475/280
(58) Field of Search .................................................... 475/280

(56) References Cited

U.S. PATENT DOCUMENTS 5,194,055 * 3/1993 Oshidari ................................. 475/280

FOREIGN PATENT DOCUMENTS 4-19450 * 1/1992 (JP) ...................................... 475/280

* cited by examiner

*Primary Examiner*—Dirk Wright
(74) *Attorney, Agent, or Firm*—George A. Grove

(57) ABSTRACT

A powertrain has an engine and torque converter that provides power to a multi-speed planetary transmission. The transmission includes a compound planetary gear set and a simple planetary gear set that are selectively interconnected by a plurality of selectively engageable torque transmitting mechanisms. The planetary carrier assembly member of the compound planetary gear set is continually connected to be driven by the torque converter, and the ring gear of the simple planetary gear set is connected to continually drive the transmission output shaft. A plurality of torque transmitting mechanisms, including the interconnecting mechanisms, are selectively engaged in combinations of three to establish six forward speed ratios and a reverse ratio.

8 Claims, 1 Drawing Sheet

| GEAR | RATIO | 28 | 30 | 32 | 34 | 36 | 38 |
|------|-------|----|----|----|----|----|----|
| REV  | -2.45 |    | X  | X  |    | X  |    |
| 1st  | 3.86  |    | X  | X  |    |    | X  |
| 2nd  | 2.72  |    |    | X  | X  | X  |    |
| 3rd  | 1.49  |    |    | X  | X  |    | X  |
| 4th  | 1.00  | X  |    | X  | X  |    |    |
| 5th  | 0.71  | X  |    |    | X  |    | X  |
| 6th  | 0.56  | X  |    |    | X  | X  |    |

X = ENGAGED

POWERTRAIN WITH A SIX SPEED TRANSMISSION

TECHNICAL FIELD

This invention relates to powertrains having multi-speed power transmissions and more particularly to such transmissions having six forward speed ratios.

BACKGROUND OF THE INVENTION

In an effort to improve the overall performance of a vehicle while also reducing the mass of the vehicle, the number of speed ratios available through the transmission is increased. This permits a more efficient use of the engine operating range while also reducing the size of the engine. The increased number of speed ratios allows for a higher low gear ratio which will result in a reduced size torque converter.

The number of forward speed ratios in power transmissions has increased from two to five over a number of years. Many of the five speed transmissions incorporate two or three interconnected simple or compound planetary gear sets and five or six selectively engageable clutches or brakes. These transmissions quite often include one or more bridging clutches when two interconnected planetary gear sets are utilized. One example of this type of power transmission can be seen in U.S. Pat. No. 5,830,102 issued to Coffey on Nov. 3, 1998.

Currently, many manufacturers are considering increasing the number of ratios to six or seven. These transmissions generally contain three planetary gear sets. One such transmission is seen in U.S. Pat. No. 3,946,623 issued Mar. 30, 1976. This prior art transmission incorporates four interconnected planetary gear sets, three clutches and four brakes when more than five speed ratios are to be attained.

A six speed planetary transmission having two simple planetary gear sets is disclosed in U.S. Ser. No. 09/383,429 filed Aug. 27, 1999 and assigned to the assignee of this application. Other six speed planetary transmissions having a simple planetary gear set and a compound planetary gear set are disclosed in co-pending U.S. Ser. Nos. [Attorney Docket Nos. GP-300124, GP-300125 and GP-300126].

SUMMARY OF THE INVENTION

It is an object of the present invention to provide an improved multi-speed planetary transmission having two planetary gear sets.

In one aspect of the present invention, the transmission has a simple planetary gear set and a compound planetary gear set that are selectively interconnectable. In another aspect of the present invention, the ring gear member of the simple planetary gear set is continuously connected with an output shaft and the planetary carrier assembly member of the compound planetary gear set is continuously connected with an input shaft.

In yet another aspect of the present invention, the sun gear members of the planetary gear sets are selectively interconnected by a selectively engageable torque transmitting mechanism. In still another aspect of the present invention, the planetary carrier assembly member of the compound planetary gear set and the sun gear member of the simple planetary gear set are selectively interconnected by a selectively engageable torque transmitting mechanism.

In a further aspect of the present invention, the ring gear member of the compound planetary gear set and the planetary carrier assembly member of the simple planetary gear set are selectively interconnected by a selectively engageable torque transmitting mechanism. In yet a further aspect of the present invention, the planetary carrier assembly member of the simple planetary gear set is selectively connected with the input shaft by a selectively engageable torque transmitting mechanism. In still a further aspect of the present invention, the above-mentioned four torque transmitting mechanisms and two additional selectively engageable torque transmitting mechanisms are engaged in combinations of three to establish six forward speed ratios and one reverse ratio between the input shaft and the output shaft.

DESCRIPTION OF AN EXEMPLARY EMBODIMENT

Figures 1, 2:
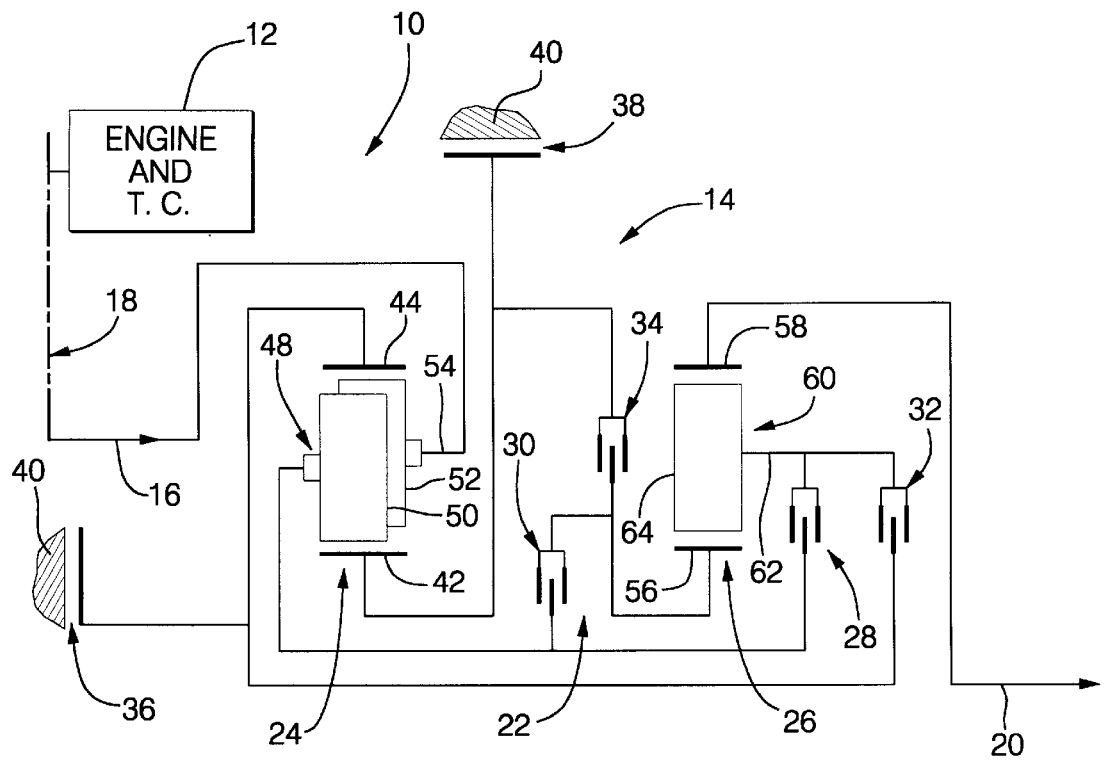
FIG. 1 is a schematic representation of a powertrain incorporating the present invention.
FIG. 2 is a chart setting forth the engagement schedule of the torque transmitting mechanisms in FIG. 1 and a list of exemplary speed ratios.

A powertrain 10 has an engine and torque converter 12, and a planetary transmission 14. The engine and torque converter 12 drive an input shaft 16 of the planetary transmission 14 through a conventional power transfer mechanism 18. The transmission 14 also has an output shaft 20 and a planetary gear arrangement 22. The planetary gear arrangement 22 includes a compound planetary gear set 24, a simple planetary gear set 26, a plurality of rotating torque transmitting mechanisms or clutches 28, 30, 32 and 34, and two stationary torque transmitting mechanisms or brakes 36 and 38, which are operatively connected with a stationary portion, such as a housing, 40 of the transmission 14.

The compound planetary gear set 24 has three rotatable members including a sun gear member 42, a ring gear member 44 and a planetary carrier assembly member 48. The planetary carrier assembly member 48 has a plurality of pairs of intermeshing pinion gears 50 and 52 that are rotatably mounted on a cage or spider 54. The pinion gears 50 also mesh with the sun gear member 42 and the pinion gears 52 also mesh with the ring gear member 44. Thus, the sun gear member 42 and the ring gear member 44 cannot rotate in opposite directions. The planetary carrier assembly member 48 is operatively connected with the torque transmitting mechanisms 28 and 30 and continuously connected for common rotation with the input shaft 16; the sun gear member 42 is operatively connected with the torque transmitting mechanisms 34 and 38; and the ring gear member 44 is operatively connected with the torque transmitting mechanisms 32 and 36.

The simple planetary gear set 26 has three rotatable members including a sun gear member 56, a ring gear member 58 and a planetary carrier assembly member 60. The planetary carrier assembly member 60 has a cage or spider 62 on which is rotatably mounted a plurality of pinion gear members 64 disposed in meshing relation with the sun gear member 56 and the ring gear member 58. The ring gear member 58 is continuously drivingly connected with the output shaft 20. The sun gear member 56 is operatively connected with the torque transmitting mechanisms 30 and 34. The planetary carrier assembly member 60 is operatively connected with the torque transmitting mechanisms 28 and 32.

When the torque transmitting mechanism 28 is engaged, the planetary carrier assembly members 48 and 60 are interconnected and also connected with the input shaft 16. When the torque transmitting mechanism 32 is engaged, the ring gear member 44 and the planetary carrier assembly member 60 are selectively interconnected. When the torque transmitting mechanism 30 is engaged, the planetary carrier assembly member 48 and the sun gear member 56 are selectively interconnected together and also with the input shaft 16. When the torque transmitting mechanism 34 is engaged, the sun gear member 42 and the sun gear member 56 are selectively interconnected. When the torque transmitting mechanism 36 is engaged, the ring gear member 44 and the torque transmitting mechanism 32 are selectively connected to ground. When the torque transmitting mechanism 38 is engaged, the sun gear member 42 and the torque transmitting mechanism 34 are selectively connected to ground.

The selective actuation or engagement of the torque transmitting mechanisms in combinations of three will provide six forward speed ratios and one reverse speed ratio as indicated in FIG. 2. The ratios given in FIG. 2 are determined with the tooth ratio of the ring gear member 58 to the sun gear member 56 of 2.45 and the tooth ratio of the ring gear member 44 to the sun gear member 42 of 1.90. To establish the reverse speed ratio, the torque transmitting mechanisms 30, 32 and 36 are engaged. The planetary carrier assembly member 60 becomes a reaction member (torque transmitting mechanisms 36, 32) and the sun gear member 56 becomes an input member (torque transmitting mechanism 30). The ring gear member 58 will rotate opposite the sun gear member 56 at a reduced speed which is determined by the ratio of the ring gear member 58 to the sun gear member 56. The reverse speed ratio is determined solely by the simple planetary gear set 26.

To establish the first and lowest forward speed ratio, the torque transmitting mechanisms 30, 32 and 38 are engaged. The sun gear member 42 becomes a reaction member (torque transmitting mechanism 38), the sun gear member 56 is an input member (torque transmitting mechanism 30), and the planetary carrier assembly member 60 is an input member (torque transmitting mechanism 32). The sun gear member 56 rotates at the speed of the input shaft 16 and the planetary carrier assembly member 60 rotates forwardly at a reduced speed determined by the ratio of the compound planetary gear set 24. The ring gear member 58 rotates forwardly at a reduced speed determined by the ratio of the simple planetary gear set 26 which has two input members, namely the sun gear member 56 and the planetary carrier assembly member 60. The first forward speed ratio between the input shaft 16 and the output shaft 20 is determined by both the compound planetary gear set 24 and the simple planetary gear set 26.

The second forward speed ratio is determine by the engagement of the torque transmitting mechanisms 32, 34 and 36. The first/second shift is a double transition interchange. The ring gear member 44 and the planetary carrier assembly member 60 are reaction members (torque transmitting mechanisms 32 and 36); the sun gear member 56 (torque transmitting mechanism 34 and sun gear member 42) is an input member rotating reversely at a reduced speed at a ratio determined by the compound planetary gear set 24. The ring gear member 58 is rotated forwardly at a speed determined by the speed of the sun gear member 56 and the ratio of the simple planetary gear set 26. Both of the planetary gear sets 24 and 26 effect the overall ratio during operation in the second forward speed ratio.

The third forward speed ratio is established by the engagement of the torque transmitting mechanisms 32, 34 and 38. The second/third interchange is a single transition shift. The sun gear members 42 and 56 become reaction members (torque transmitting mechanisms 34 and 38). The ring gear member 44 rotates the planetary carrier assembly member 60 forwardly at a reduced speed (torque transmitting mechanism 32) determined by the ratio of the compound planetary gear set 24. The ring gear member 58 is driven forwardly at a reduced speed determined by the speed of the planetary carrier assembly member 60 and the ratio of the simple planetary gear set 26. Both planetary gear sets 24 and 26 effect the overall ratio between the input shaft 16 and the output shaft 20 during operation in the third forward ratio.

The fourth forward speed ratio is established by the engagement of the torque transmitting mechanisms 28, 32 and 34. The three/four interchange is a single transition shift. The fourth forward speed ratio is a direct drive with both planetary gear sets 24 and 26 being conditioned for a direct drive or one to one ratio.

The fifth forward speed ratio is established by the engagement of the torque transmitting mechanisms 28, 34 and 38. The four/five interchange is a single transition shift. The sun gear member 56 becomes a reaction member (torque transmitting mechanisms 34 and 38) and the planetary carrier assembly member 60 is an input member (torque transmitting mechanism 28). The ring gear member 58 rotates forwardly at an overdrive ratio determined solely by the simple planetary gear set 26.

The sixth forward speed ratio is established by the engagement of the torque transmitting mechanisms 28, 34, 36. The five/six ratio change is a single transition shift. The ring gear member 44 is a reaction member (torque transmitting mechanism 36), planetary carrier assembly member 60 is an input member (torque transmitting mechanism 28), and the sun gear member 56 is an input member (torque transmitting mechanism 34 and sun gear member 42). The sun gear member 56 rotates reversibly at a reduced ratio determined by the compound planetary gear set 24, and the ring gear member 58 rotates forwardly at an overdrive ratio determined by the simple planetary gear set 26 and the compound planetary gear set 24.

As pointed out above, the reverse speed ratio and the fifth forward speed ratio are determined by the simple planetary gear set 26 only; the first, second, third, and sixth forward speed ratios are determined by both planetary gear sets 24 and 26, and the fourth forward speed ratio is a direct drive. With the exception of the one/two interchange, all of the ratio interchanges are single transition shifts. As will be recognized from FIG. 2, all of the torque transmitting mechanisms are engaged during more than one ratio. The reuse of the torque transmitting mechanisms is efficient space management. The torque transmitting mechanisms 32 and 34 are each used during the establishment of five ratios, and the torque transmitting mechanisms 28, 36, and 38 are each used during the establishment of three ratios. Those skilled in the art will recognize that the fourth forward ratio can be established by other combinations of torque transmitting mechanism engagement. However, the combination selected permits single transition interchanges into and out of the fourth ratio.

What is claimed is:

1. A powertrain having a multi-speed transmission comprising:

an input shaft;

an output shaft;

a compound planetary gear set having three rotatable members comprising a sun gear member, a ring gear member and a planetary carrier assembly member, said planetary carrier assembly member being continuously connected with said input member;

a simple planetary gear set having three rotatable members comprising a sun gear member, a ring gear member and a planetary carrier assembly member, said ring gear member being continuously connected with said output shaft;

a first torque transmitting mechanism selectively interconnecting said planetary carrier assembly member of said compound planetary gear set with said planetary carrier assembly member of said simple planetary gear set;

a second torque transmitting mechanism selectively interconnecting said planetary carrier assembly member of said compound planetary gear set with said sun gear member of said simple planetary gear set;

a third torque transmitting mechanism selectively interconnecting said ring gear member of said compound planetary gear set with said planetary carrier assembly member of said simple planetary gear set;

a fourth torque transmitting mechanism selectively interconnecting said sun gear member of said compound planetary gear set with said sun gear member of said simple planetary gear set;

a fifth torque transmitting mechanism selectively interconnecting said ring gear member of said compound planetary gear set and said third torque transmitting mechanism with a stationary portion of the transmission;

a sixth torque transmitting mechanism selectively interconnecting said sun gear member of said compound planetary gear set and said fourth torque transmitting mechanism with said stationary portion; and said torque transmitting mechanisms being selectively engaged in combinations of three to establish six forward speed ratios and a reverse speed ratio between said input shaft and said output shaft.

2. The powertrain having a multi-speed transmission defined in claim 1 further comprising:

said third and fourth torque transmitting mechanisms each being selectively engaged during five of said speed ratios, and said first, fifth and sixth of said torque transmitting mechanisms each being selectively engaged during three of said speed ratios.

3. The powertrain having a multi-speed transmission defined in claim 1 further comprising:

said fourth and sixth torque transmitting mechanisms cooperating when engaged to establish both of said sun gear members as reaction members during two of said forward ratios, and said fifth and third torque transmitting mechanisms cooperating when engaged to establish said ring gear member of said compound planetary gear set and said planetary carrier assembly member of said simple planetary gear set as reaction members during another of said forward ratios and said reverse ratio.

4. The powertrain having a multi-speed transmission defined in claim 1 further comprising:

said ring gear member and sun gear member of said simple planetary gear set having a first tooth ratio;

said ring gear member and said sun gear member of said compound planetary gear set having a second tooth ratio;

said reverse ratio and one of said forward ratios being determined solely by said first tooth ratio; and four other of said forward speed ratios being determined by both said first and second tooth ratios.

5. A multi-speed planetary transmission comprising:

an input shaft;

an output shaft;

a compound planetary gear set having first, second, and third rotatable members, said second rotatable member being continuously connected for co-rotation with said input shaft;

a simple planetary gear set having fourth, fifth, and sixth rotatable members, said sixth rotatable member being continuously connected for co-rotation with said output shaft;

first torque transmitting means for selectively connecting said fifth rotatable member to said second member for co-rotation therewith;

second torque transmitting means for selectively connecting said second rotatable member with said fourth rotatable member for co-rotation;

third torque transmitting means for selectively interconnecting said third rotatable member and said fifth rotatable member for conjoint operation;

fourth torque transmitting means for selectively interconnecting said first rotatable member and said fourth rotatable member for conjoint operation;

fifth torque transmitting means for selectively restraining rotation of said third rotatable member;

sixth torque transmitting means for selectively restraining rotation of said first rotatable member; and said torque transmitting means being selectively actuated in combinations of three for establishing a reverse speed ratio and six forward speed ratios.

6. The multi-speed planetary transmission defined in claim 5 further comprising:

said third torque transmitting means being actuated during said reverse speed ratio and four successive forward speed ratios including a lowest speed ratio; and said fourth torque transmitting means being actuated during five successive forward speed ratios including a highest speed ratio.

7. The multi-speed planetary transmission defined in claim 5 further comprising:

said first torque transmitting means being actuated during three successive forward speed ratios including a highest speed ratio; and said sixth torque transmitting means being actuated during three non-successive forward speed ratios including a lowest speed ratio.

8. The multi-speed planetary transmission defined in claim 5 further comprising:

said second torque transmitting means being actuated during said reverse speed ratio and a lowest of said forward speed ratios; and said fifth torque transmitting means being actuated during said reverse speed ratio and two non-successive forward speed ratios including a highest speed ratio.

* * * * *